(12) United States Patent
Rice et al.

(10) Patent No.: US 10,305,401 B2
(45) Date of Patent: May 28, 2019

(54) MOTOR DRIVE CIRCUIT

(71) Applicant: TRW Limited, Solihull (GB)

(72) Inventors: Nathanael Rice, Nottinghamshire (GB);
David Moule, Birmingham (GB);
Geoffrey Holland, Worcestershire (GB)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 15/786,747

(22) Filed: Oct. 18, 2017

(65) Prior Publication Data

US 2018/0109212 A1    Apr. 19, 2018

(30) Foreign Application Priority Data

Oct. 18, 2016    (GB) .................................... 1617653.9

(51) Int. Cl.
*H02H 7/08*    (2006.01)
*H02P 7/29*    (2016.01)
(Continued)

(52) U.S. Cl.
CPC ................. *H02P 7/29* (2013.01); *H02H 1/00* (2013.01); *H02P 7/05* (2016.02); *H02P 29/028* (2013.01); *H02P 27/06* (2013.01)

(58) Field of Classification Search
CPC . H02P 7/04; H02P 7/05; H02J 7/0031; H02H 7/18
See application file for complete search history.

(56) References Cited

U.S. PATENT DOCUMENTS 6,963,183 B1    11/2005    Kessler et al.
2004/0150927 A1    8/2004    Strayer et al.
(Continued)

FOREIGN PATENT DOCUMENTS

EP    2182629 A2    5/2010
EP    2755314 A1    7/2014

OTHER PUBLICATIONS

Patents Act 1977: Search Report under Section 17(5), Application No. GB1617653.9, dated Mar. 22, 2017.

*Primary Examiner* — Karen Masih
(74) *Attorney, Agent, or Firm* — MacMillan, Sobanski & Todd, LLC

(57) ABSTRACT

An electrical circuit for driving at least one electric motor, the at least one motor having at least one set of phases windings. The electrical circuit is arranged as at least one lane comprising a motor drive circuit that is operable in use to supply drive voltages to one of the sets of phase windings of the motor. A reverse battery protection circuit is provided for at least one lane and is located in either a feed to the motor drive circuit from a power supply or in a return path from the motor drive circuit to the power supply. The reverse battery protection circuit comprises a switch which is normally open when the battery is disconnected and which remains open in the event that the battery is connected in error with a reverse polarity to the drive circuit. The electrical circuit also includes a control means which is arranged to control the switch of the reverse battery protection circuit so as to close the switch in the event that the control means determines that the battery is connected with the correct polarity. The switch is also opened during operation of the motor in the event that that one or more additional conditions are met.

11 Claims, 3 Drawing Sheets

(51) Int. Cl.
  *H02P 7/03*  (2016.01)
  *H02P 29/028* (2016.01)
  *H02H 1/00*  (2006.01)
  *H02P 27/06*  (2006.01)

(56) References Cited

U.S. PATENT DOCUMENTS

| | | | |
|---|---|---|---|
| 2008/0061742 A1* | 3/2008 | Funabashi | H01M 10/425 |
| | | | 320/127 |
| 2011/0026171 A1 | 2/2011 | Pavlin | |
| 2014/0055887 A1 | 2/2014 | Uryu et al. | |
| 2016/0142002 A1 | 5/2016 | Rummel et al. | |

\* cited by examiner

MOTOR DRIVE CIRCUIT

CROSS-REFERENCE TO RELATED APPLICATIONS

This application claims priority to Great Britain Patent Application No. 1617653.9, filed 18 Oct. 2016, the disclosures of which are incorporated herein by reference in entirety.

BACKGROUND OF THE INVENTION

This invention relates to motor drive circuits for electric motors, in particular but not exclusively for use in automotive applications.

It is known to provide electric motors in a range of automotive applications, including electric power assisted steering systems where the motor acts directly upon a part of a steering system to generate a driver assistance torque, and in braking and steering systems where the motor drives a pump which in turn moves hydraulic fluid around the system.

It is known to drive a multiphase electric motor by connecting each phase of the motor to motor drive circuit, typically in the form of a bridge. In a known drive circuit the end of each phase is connected to an upper arm including a switch connected to one terminal of a battery, and a lower are including a semiconductor switch connected to the other terminal of the battery. For a three phase motor the drive stage may comprise a three phase bridge with three of these pairs of arms.

In use, a controller applies voltage patterns to each switch of the drive circuit to cause the switches to open and close rapidly in a defined pattern, thus controlling the amplitude and phase of the voltage applied to each phase of the motor. The phases can be advanced or retarded relative to any back emf voltages generated by the motor rotation as required depending on the motor control strategy used.

With a multi phase motor connected to a drive circuit the motor will generate a back emf which can exceed the battery supply voltage. This may happen when the motor is not being driven by the bridge circuit but is subject to a torque applied to the rotor that causes it to rotate at high speed, or even where it is being driven of the speeds are high enough. This back emf can prove problematic if left unchecked. FIG. 1 illustrates a possible closed path around a motor 100, through the body diodes of the MOSFET switches in a drive bridge 101 and the battery supply 102. When motoring the high back emf may be overcome by advancing the current waveform applied to the motor to weaken the magnetic field prior to the peak back emf. This allows the motor to spin faster than would otherwise be possible.

In the event of a fault in the drive circuit, or in the supply lines connecting the circuit to the power supply, or with the motor controller, or simply when the motor is not being driven but is being back-driven by a torque applied to the rotor causing it to act as a generator, it may not be possible to sufficiently weaken the field by advancing the electric field. This will result in the full back emf being generated which is then conducted via the MOSFET diodes onto the battery—notionally onto the DC battery bus and from there back into the battery. While not destructive, the applicant has appreciated that this can act as a significant drag on the motor, limiting high speed operation.

For many applications a rising demand is being seen in providing additional safety through the use of redundancy in the circuit design. In one arrangement, a dual drive bridge circuit is proposed with either two motors or one motor having two sets of independent phase windings and the bridge split into two independent lanes, each lane comprising a full H-bridge circuit which is connected to one of the sets of phases. In use, one of the lanes can be used to drive the motor whilst the other is kept in reserve for use where the one lane is faulty. Alternatively, both can be driven at the same time and one turned off when a fault in that lane is detected. The benefit of driving both at the same time is that the power losses across both lanes can be lower that of a single bridge driving, allowing thinner wires and lower rated switches to be used.

In a fully independent dual lane arrangement, i.e. dual bridges, each lane may receive control signals from its own control circuit and may have its own independent connections to the battery. Alternatively, for some applications a shared connection to the battery is provided, and a shared controller.

Where a dual lane arrangement is provided, and one lane is at fault, a back emf generated in this lane could create drag that opposes the attempts of the good lane to drive the motor. This would reduce the peak motor speed available.

BRIEF SUMMARY OF THE INVENTION

According to a first aspect the invention provides an electrical circuit for driving at least one electric motor, the at least one motor having at least one set of phases windings, the circuit being arranged as at least one lane comprising a motor drive circuit that is operable in use to supply drive voltages to one of the sets of phase windings of the motor, the electrical circuit including for the at least one lane a respective reverse battery protection circuit located in either a feed to the motor drive circuit from a power supply or in a return path from the motor drive circuit to the power supply, the reverse battery protection circuit comprising a switch which is normally open when the battery is disconnected and which remains open in the event that the battery is connected in error with a reverse polarity to the drive circuit, characterised in that the electrical circuit includes a control means which is arranged to control the switch of the reverse battery protection circuit so as to close the switch in the event that the control means determines that the battery is connected with the correct polarity, and further in that the control means is additionally arranged to open the switch during operation of the motor in the event that that one or more additional conditions are met.

The one or more conditions that will cause the control means to open the switch may include the back emf generated by the motor exceeding a predetermined threshold. This threshold may be set at substantially the nominal battery supply voltage or at a voltage close to the battery supply voltage, for example within 1 volt or 2 volts. The switch will then be opened if the back emf exceeds this threshold voltage. The apparatus may include a back emf measurement means that measures the voltage across the motor drive stage to determine the back emf.

This condition may be modified such that the switch is not opened at a time when the circuit intentionally requires the motor to operate as a generator and put power back into the supply. As such, the control means may receive a trigger signal indicating whether the motor is to be allowed to operate as a generator or not.

The one or more conditions may additionally or alternatively include the back emf generated by the motor substantially reaches or exceeds the instantaneous battery supply voltage. The applicant appreciates that in some cases the battery voltage will drop below the nominal value. The apparatus may include a supply voltage measurement means that measures the battery supply voltage. Again, this condition may be modified such that the switch is not opened at a time when the circuit intentionally requires the motor to operate as a generator and put power back into the supply. As such, the control means may receive a trigger signal indicating whether the motor is to be allowed to operate as a generator or not.

The one or more conditions may include a part of the apparatus being determined to be faulty, for instance that a short circuit exists that forms a closed loop including at least two motor phases. The apparatus may include a fault determining means that tests the integrity of one or more parts of the circuit to determine if a fault exists. For example, test voltages may be applied to the bridge switches and motor phases to determine their integrity.

Faults that may be detected include a failure of a drive stage switch of the drive stage, or of the controller for the drive circuit that controls the modulation of the drive stage switches.

Where the apparatus comprises at least two lanes, the one or more conditions may comprise a part of one lane being determined to be faulty where the lane is not being used to drive the motor. The control circuit may therefore monitor the function of each of the two or more lanes of the drive circuit, and in the event of a fault being detected may additionally open the switch of the corresponding reverse battery protection circuit.

This action prevents the back emf in the faulty lane from causing a current to flow back onto the supply, even a back emf below the threshold level. This may also prove beneficial in ensuring that unwanted energy in the motor is not dumped onto the battery.

Where two lanes or more are provided, the applicant has appreciated that it is beneficial to isolate a faulty lane to ensure that a back emf is not passed to the battery supply, which would reduce the battery voltage seen by the remaining good lane, thereby reducing the power available to the motor. Without isolating, the one good lane would try to drive the motor and the faulty lane may apply a drag that tries to stop the motor being driven. Isolating the faulty lane removes this drag.

The present invention therefore provides control of the operation of a reverse battery protection circuit to provide a dual function of battery reverse connection protection and mitigation of the effect of motor back emf on the motor supply under a range of operating conditions. By using one switch in a dual capacity the complexity of the circuitry is reduced and voltage drops minimised compared with a solution that addresses each problem independently, such as providing isolating switches at the motor star point for each lane.

The power supply may comprise a battery, for instance where the electrical circuit is provided as part of an electrical apparatus of a vehicle. This apparatus may comprise an electric power assisted steering system in which the motor applies a torque to the steering to assist the driver. Alternatively, the apparatus may comprise a steering or braking system that uses the motor to drive the impeller of a pump. In another alternative the apparatus may comprise an actuation apparatus for actuating a primary control surface of a plane, or perhaps a positioning system for an actuator in a safety critical application.

The switch of the reverse battery protection circuit may comprise a relay or a solid state switch, such as a transistor or a MOSFET, in series between the drive circuit and the positive terminal of the power supply or in series between the motor drive circuit and a return path to the power supply. A diode may be connected externally in parallel across the switch, or may be provided internally in parallel across the poles of the switch, which is oriented to allow conduction of current when the battery is connected with the correct polarity but does not allow conduction in the reverse direction.

The switch may in fact comprise two sub-switches arranged in parallel, both controlled by the control means.

The control means may include a discrete arrangement of analogue electrical components which are configured to cause the switch to close when the battery is correctly connected by applying a fraction of the battery voltage to the base of the transistor.

Alternatively or additionally, the control means may comprise a digital circuit which measures the voltage dropped across one or more parts of the electrical circuit and from the measurements generates a voltage that is applied to the switch—e.g. to the base of the transistor or gate of the MOSFET when the switch is to be opened or closed.

The control means may comprise two discrete circuits for controlling the switch dependent on the battery polarity and controlling the switch dependent on the back emf, the output of the two circuits being passed through a logic gate before being applied to the switch.

Alternatively, the control means may comprise a digital circuit which measures the voltage dropped across one or more parts of the electrical circuit to control the switch for reverse battery protection and to cause the switch to open when the measured voltages indicate that the back emf is sufficient to provide a drag on the motor.

The control means may comprise a digital circuit which controls the switch for reverse battery protection based on the operating mode of the motor or the health of all the components within the drive circuit.

The control means may comprise a means to measure the direction of current through the reverse battery protection, and only allow regenerative current to flow, when commanded to do so but to enable the switch during normal operation to minimise losses.

Each lane may be provided with a respective reverse battery protection circuit that is located between the lane and the power supply. A common control circuit may be provided that gives independent control of each switch of the battery protection circuits or each reverse battery protection circuit may be provided with its own control means.

The drive circuit may include a filter capacitor that is connected between the positive feed to two lanes and the earth return for the two lanes, the reverse battery protection switch of each lane being located in the electrical circuit such that when it is open it does not isolating the filter capacitor from the drive circuit whilst isolating the battery.

This allows the filter capacitor to store energy when the battery is isolated There may be two filter capacitors. Each capacitor may comprise a supercapacitor.

The control circuit may therefore be arranged in use to open the switch when the motor is generating power, for instance when the rotor is being spun within the stator due an external load. In this case, the electrical energy produced will be pushed onto the filter capacitor where the energy is stored for later release into the engine.

The control circuit may monitor the energy stored in the capacitor and control the switch operation as a function of the stored energy in the capacitor.

The control circuit may determine that the back emf has exceeded a predetermined level by measurement of a voltage dropped across a resistance provided in series with the switch of the battery reverse voltage protection circuit, the voltage being proportional to the current flowing through the resistance which will in turn depend on the back emf and hence provide an indication that the motor is regenerating.

The battery may be connected directly to the electrical circuit, or may be connected to a power transmission bus to which the drive circuit is connected. In the later case, the reverse battery protection circuit may isolate, when open, the drive circuit from one of the connections to the bus.

Each drive stage may comprise an H-bridge driver, which includes for each phase of the motor a drive stage switch connecting each phase to one terminal of the power supply and a further drive stage switch connecting each phase to the other terminal of the power supply.

The motor may comprise one set of phase windings for each lane of the drive circuit, each set being fully independent of the other. Alternatively, the two or more lanes may all be connected to the one set of supplies so that they are only partially independent. Only the first arrangement gives full independent control of the motor.

Other advantages of this invention will become apparent to those skilled in the art from the following detailed description of the preferred embodiments, when read in light of the accompanying drawings.

DETAILED DESCRIPTION OF THE INVENTION

Figure 2:
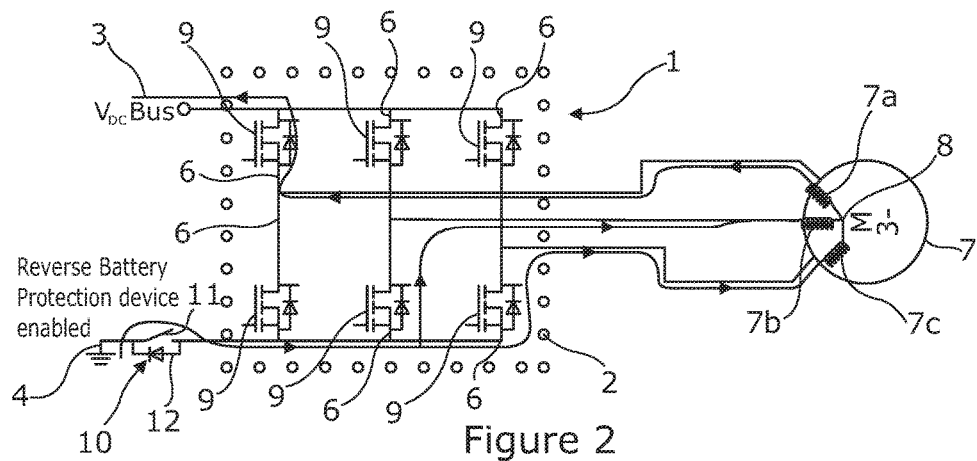
FIG. 2 is a circuit diagram showing the motor and one lane of a first embodiment of an electrical circuit in accordance with the present invention.

FIG. 2 shows a part of an embodiment of an electrical circuit 1 in accordance with the present invention. The figure shows a single lane of a multi-lane circuit, the other lanes being omitted for clarity.

The circuit 1 comprises a conventional three phase bridge motor drive circuit 2, enclosed within the dotted line in the figure, connected to the positive terminal 3 of a supply bus (not shown) at a nominal voltage $V_{DC\ Bus}$ and to an earth terminal 4 of the supply bus. The supply bus is powered by a battery (also not shown). The bridge 2 as shown comprises three pairs of arms 6, each pair being connected at a centre tap to a free end of a phase of an electric motor. The circuit is used to drive a motor 7 which as shown has three phases 7a, 7b, 7c, all connected together at a star point 8. Other topologies, such as a delta connected motor, are also applicable to the present invention. Each arm 6 of the bridge includes a solid state MOSFET or bipolar transistor drive stage switch 9. Each switch 9 is controlled by a motor controller (not shown) which applies PWM voltage waveforms to the gate or base of each switch when the motor is being driven. The shape and timing of these waveforms will be well known to the reader and so will not be described here in any detail.

Connected in series in the line between the bridge 2 and the earth terminal 4 is a reverse battery protection circuit 10. This is represented very simply in FIG. 2 by a MOSFET switch 11 in parallel with a diode 12. The diode 12 is arranged so that with the switch 11 open current can flow from the positive terminal through the diode to the earth, but not the other way. This ensures that a battery connected the right way will immediately conduct through the bridge and out via the diode, but if connected the wrong way cannot conduct through the open switch or reverse connected diode.

Figure 3:
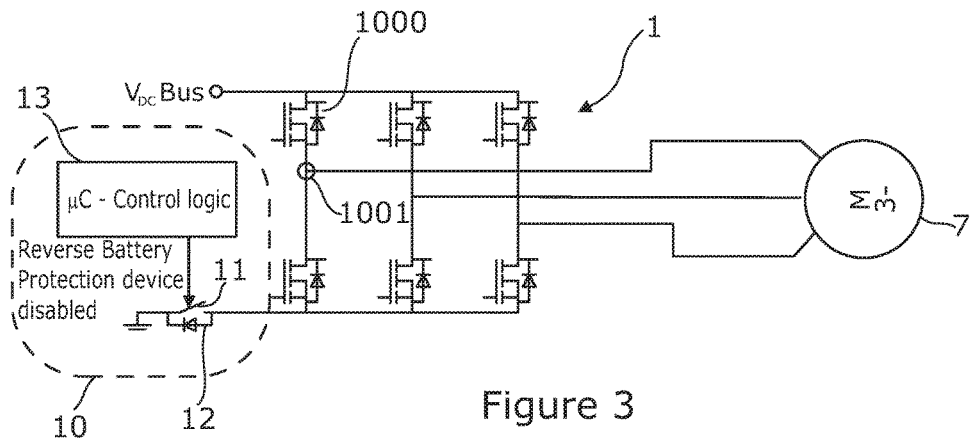
FIG. 3 is a more detailed view of the circuit of FIG. 2 showing the control circuit for the switch of the reverse battery protection circuit.

FIG. 3 shows additional detail of the electrical circuit, and in particular a control means which actively controls the opening and closing of the switch. As shown the control means comprises a microprocessor 13 which executes control logic to determine when to open the switch. In this example the control circuit is responsive to measurements of voltages at various locations around the electrical circuit as well as the results of integrity tests performed on parts of the circuit such as the drive stage bridges. For example the microprocessor may execute a control strategy that determines when to open or close the switch based on determining one or more of the state of the bridge driver, of the bridge, the state of the control logic, a measurement of the back emf level, and a measurement of the supply voltage, the state of the battery, the integrity of the bridge switches.

In the case of a correctly connected battery, the diode 12 of the reverse battery protection circuit is used for conduction until the control means 13 or other safety circuit confirms the operation of the bridge and the battery condition. Whilst in this state the diode 12 allows conduction in the forward direction allowing current to flow to power the control circuit and other circuitry but preventing the bridge diodes from rectifying any back emf from the motor onto the DC supply. Then once the appropriate conditions have been met to demonstrate the bridge is able to control the motor, the reverse battery protection device is enabled by closing the switch 11. This is achieved by the control means applying a voltage to the gate of the MOSFET switch causing it to close. This results in the reduction in losses across the device during high current demands, and allows the unit to generate onto the DC bus during normal operation if this is desired.

Figure 1:
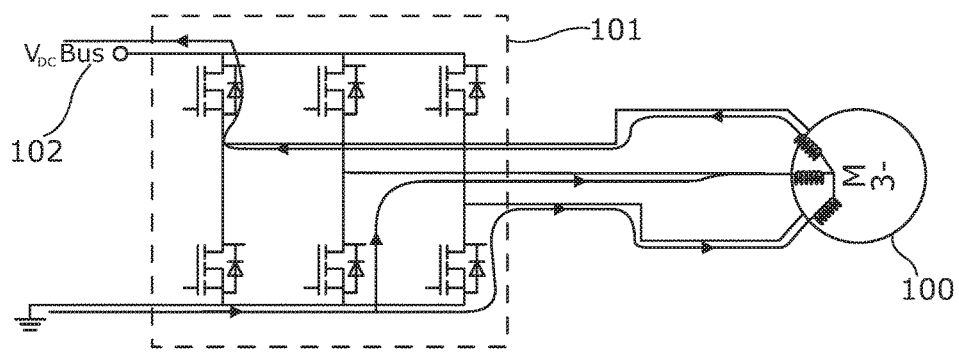
FIG. 1 is a circuit diagram of a prior art electrical circuit for driving an electric motor.

The control means 13 in use also opens the switch 11 to partially disconnect the battery from the motor to prevent current flow while the unit is inoperable. FIG. 1 shows the current flow during normal motor rotation causing a back emf above the $V_{DC}$ Bus level without the bridge being actively driven. This results in the current flowing through the internal diodes within the MOSFETS and onto the supply lines, drawing current from the ground and pushing it onto the supply. The path shown is just one of many possible paths depending on the rotor position during the rotation of the motor. With the embodiment in accordance with the invention, this flow can be prevented by the control circuit opening the battery reverse voltage protection switch.

The function of the control means 13 in the embodiments shown may be as follows:

initially determine when the bridge is operational and only close the switch of the reverse polarity protection circuit if:
(i) the system is able to fulfil normal motoring operation, or
(ii) when the control circuit determines there is a requirement to allow the motor to generate and put power back in to the supply for example when braking the motor quickly.

At other times, such as when there is a high back emf or a fault, or when it is determined that it is desirable to dump energy into the filter capacitor, the control circuit opens or holds open the switch.

These scenarios could be determined based on bridge operation, current flow, dc bus voltage sensing, phase voltage sensing, predictive algorithms or any other process to prevent current flowing onto the supply when undesired.

Until the reverse battery protection circuit is enabled by the switch 11 being closed, normal current can flow to power the control circuit and other control logic for the bridge driver circuit through the diode of the battery reverse polarity protection circuit allowing low power devices to continue operating. Before any high power is consumed, such as in normal motoring operation, the reverse battery protection needs to be connected to reduce power dissipation within the device and any overheating problems this may cause. It also needs to be connected before any desired damping torque can be provided.

The reverse battery protection circuit in the embodiment of FIGS. 2 and 3 is placed in the return to earth. However, the skilled person will understand that it is within the scope of the present invention to alternatively place this in the positive supply line with the same effect. An arrangement of this kind is shown in FIG. 4 of the drawings.

Figure 4:
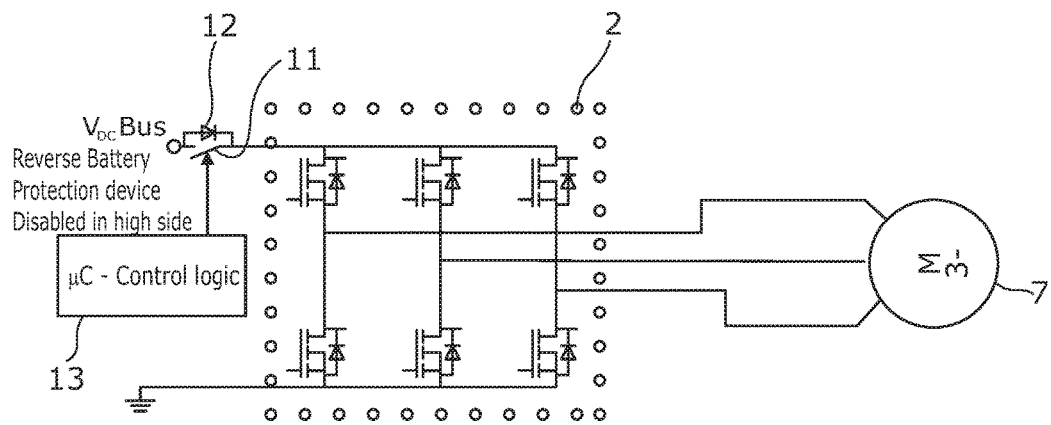
FIG. 4 is a circuit diagram showing the motor and one lane of a second embodiment of an electrical circuit in accordance with the present invention.
Figure 5:
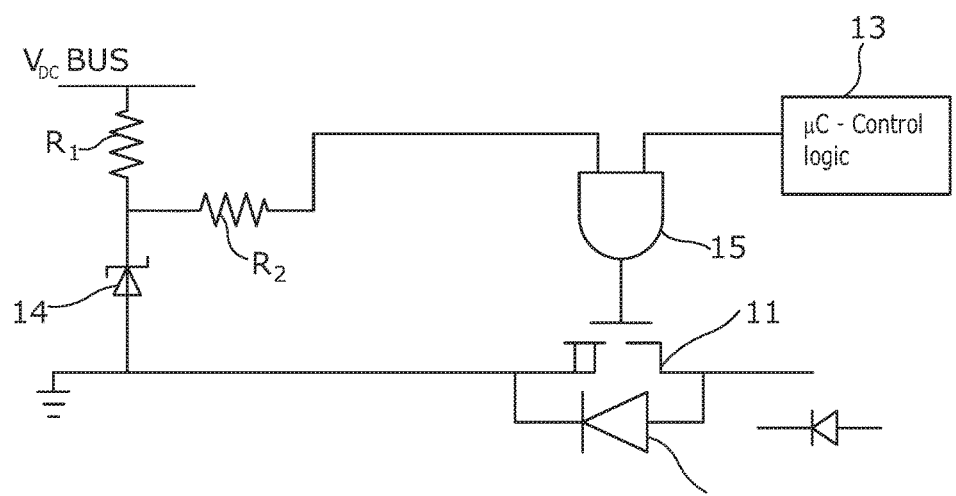
FIG. 5 is a detailed view of possible arrangement of control circuit for the switch of the reverse voltage protection circuit of the first or second embodiments.

Although the embodiments of FIGS. 2 to 4 may use a microcontroller to provide full active control of the switch, an alternative arrangement may be provided which combines passive operation of the switch following correct connection of the battery and active control of the switch for all other functions. An arrangement of this kind is shown in FIG. 5. As can be seen, the gate of the switch 11 is connected to a passive analogue circuit comprising a voltage divider (resistors R1 and R2) and a Zener diode 14. The analogue circuit will apply a voltage to the gate of the switch 11 as soon as current flows through a sense resistor R1. This current initially flows from the positive battery terminal to the earth through the diode. The circuit as shown comprises a current limiting resistor, R1, a voltage limiting Zener diode, 14, and gate resistor, R2 (optional). When the voltage at VDCBUS goes above the threshold voltage of the switch, the switch is turned on, the switch is then protected by an over voltage on the gate, by the Zener diode 14, and the Zener diode 14 is protected by an over voltage on the supply by the resistor R1. R2 protects the switch from a failure of either R1 or 14.

Hence the switch opens automatically when a correctly oriented battery is connected. This signal is passed to the gate through an AND gate 16, the other input of the AND gate being provided with a voltage from the control circuit 13. This allows the control circuit 13 to re-open the switch whenever it is required by removing the voltage from the AND gate.

Of course, other logic could be used instead of the AND gate, or the voltage dropped across the sense resistor could be fed into the control circuit as a control input.

Figure 6:
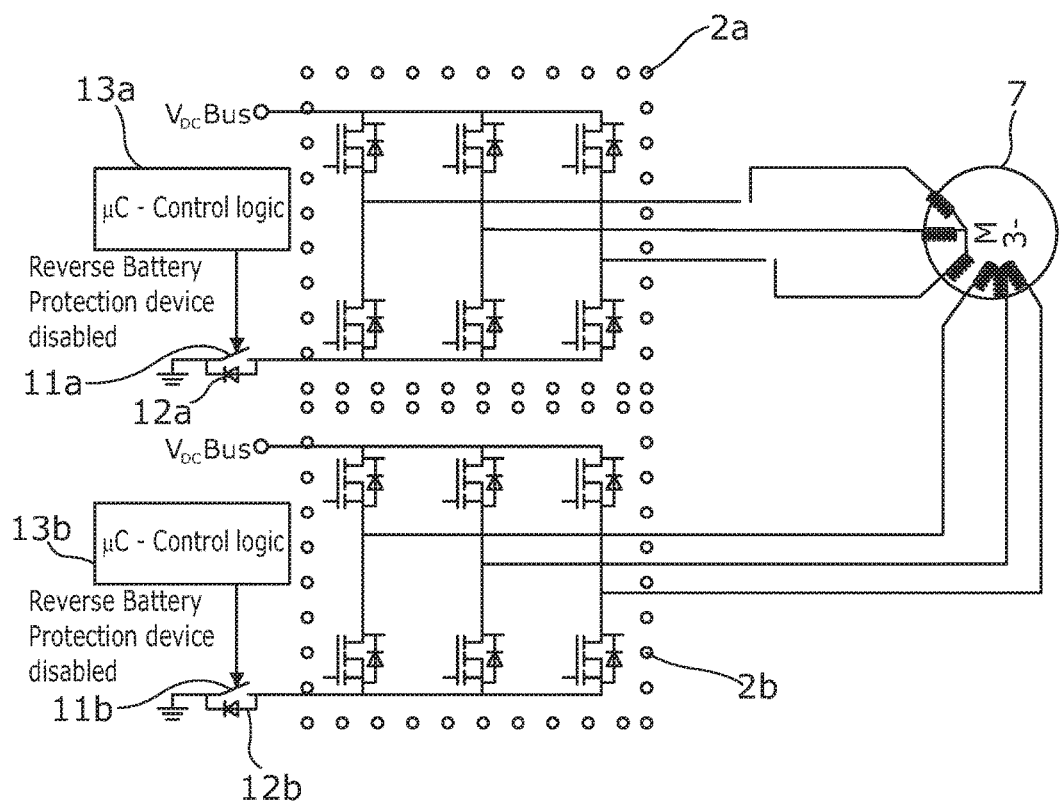
FIG. 6 is a circuit diagram showing an electrical circuit in accordance with the present invention with two fully independent lanes to drive two set of fully independent motor phases.

The invention is in particular applicable to dual lane circuits. Whilst FIGS. 1 to 3 show only one lane for clarity in explaining the operation of the circuit, there will in practice be at least two lanes. FIG. 6 shows the arrangement of two lanes which are fully independent. Each lane comprises a drive bridge 2a and 2b, a dedicated battery reverse polarity protection switch 11a, 11b and diode 12a, 12b and a dedicated controller 13a and 13b. Also as shown the motor in this example is dual wound, with two independent sets of three phase winding, each set with its own star point. The skilled person will appreciate that it is possible to use two motors, connected by a mechanical linkage rather than one motor. Each motor would have one of the sets of windings.

Considering the dual arrangement of FIG. 6, the significant benefits of the active battery reverse polarity protection circuit can be easily appreciated. Take the case of a relatively low, but non-zero resistance fault external to the motor drive, within the power supply network of one of the two lanes (in a multi-lane system there could of course be more than two lanes). This will cause the voltage at the terminals of the motor drive power electronics to reduce so as to render this lane of the motor drive effectively unusable for motoring operation. Without any reverse battery module (the prior art circuit of FIG. 1,) any motoring operation from the good lanes of the motor will result (once the back emf has exceeded that of two diode volt drops) in generation through the body diodes of the six transistors in the three phase bridge. This will result in the faulted lane providing a drag torque. If a reverse battery module is included, and is not operated, the generating operation is stopped. However, with passive control of the reverse battery module, then depending upon the back emf, external resistance in the faulted supply, and threshold for enabling the reverse battery module, the reverse battery module could automatically close once higher speeds are attained: this would allow power to be generated in to the low resistance fault and a consequent drag torque, compromising performance of the drive.

The circuit of the invention provides an actively controlled reverse battery protection circuit. This helps prevent the drag, and assists in mitigating a power supply fault external to the motor drive.

Furthermore any power generated and stored within the dc link capacitor with the reverse battery module inactive, can be kept within the motor drive, and used to power the relatively low power requirements of the microprocessor to enable it to communicate detail of the fault with other system components.

Inclusion of a controlled reverse battery module, (and for practical reasons likely also a free wheel diode around any power stage filter circuit,) also facilitates the opportunity, provided sufficient local energy storage is available with sufficiently high voltage rating, to:
(i) Mitigate some of the transients that would otherwise be seen by other equipment connected to the same power supply. Motor drives are frequently connected to complex power distribution networks. Rapid transients can lead to instability of these networks: being able to contain transients within equipment can assist in improving network stability, and reducing voltage transients that other connected equipment must be immune to.
(ii) Increase the drive voltage available for acceleration by locally storing energy from deceleration of the motor resulting from the scenario described above where the back emf of the motor in a non-switching bridge exceeds the supply voltage. As well as providing for increased voltage available for acceleration, and to overcome the inductance of the motor allowing the phase current to be changed more rapidly, this has the further advantage of minimising losses that would otherwise result in connecting cables.

(iii) Increase the drive voltage available for acceleration by applying phase currents to one lane of a dual lane system with an appropriate delay relative to the back emf to enable a generating mode of operation. This could apply at any speed above zero. A second (or further) lane(s) of the system provide motoring operation to provide both load torque and power transfer to increase the internal voltage of the dc link in the first lane.

In these three scenarios, rather than allowing the power generated by the motor to be returned to the supply, the reverse battery module is opened, and the energy stored in the dc link capacitor, or other suitable energy store.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An electrical circuit for driving at least one electric motor, the at least one electric motor having at least one set of phase windings, the circuit being arranged as at least one lane comprising a motor drive circuit that is operable in use to supply drive voltages to one of the at least one sets of phase windings of the at least one electric motor, the electrical circuit including for the at least one lane a respective reverse battery protection circuit located in either a feed to the motor drive circuit from a power supply or in a return path from the motor drive circuit to the power supply, the reverse battery protection circuit comprising a switch which is normally open when a battery of the power supply is disconnected and which remains open in the event that the battery is connected in error with a reverse polarity to the motor drive circuit, wherein the electrical circuit includes a control means which is arranged to control the switch of the reverse battery protection circuit so as to close the switch in the event that the control means determines that the battery is connected with a correct polarity, and further in that the control means is additionally arranged to open the switch during operation of the electric motor in the event that that one or more additional conditions are met, in which the one or more additional conditions that will cause the control means to open the switch include a back emf generated by the electric motor exceeding a predetermined threshold.

2. The electrical circuit according to claim 1 in which the predetermined threshold is set at substantially a nominal battery supply voltage or at a voltage close to the battery supply voltage.

3. The electrical circuit according to claim 1 in which the one or more additional conditions include a back emf generated by the electric motor substantially reaching or exceeding an instantaneous battery supply voltage.

4. The electrical circuit according to claim 1 in which the one or more additional conditions include a part of the electric circuit being determined to be faulty.

5. The electrical circuit according to claim 1 in which the control means modifies the one or more additional conditions such that the switch is not opened at a time when the circuit requires the electric motor to operate as a generator and put power back into the power supply.

6. The electrical circuit according to claim 1 in which the switch of the reverse battery protection circuit is connected in series between the drive circuit and a positive or earth terminal of the battery and a diode connected externally in parallel across the switch or provided internally in parallel across poles of the switch, which is oriented to allow conduction of current when the battery is connected with the correct polarity but does not allow conduction in a reverse direction.

7. The electrical circuit according to claim 1 in which the control means comprises a discrete arrangement of analogue electrical components which are configured to cause the switch to close when the battery is correctly connected by applying a fraction of a battery voltage to the switch.

8. The electrical circuit according to claim 1 in which the control means comprises a digital circuit which measures a voltage dropped across one or more parts of the electrical circuit and from the measurements generates a voltage that is applied to the switch.

9. The electrical circuit according to claim 1 in which there are at least two lanes and each lane is provided with a respective reverse battery protection circuit that is located between the lane and the power supply.

10. The electrical circuit according to claim 9 which includes a filter capacitor that is connected between a positive feed to the at least two lanes and an earth return for the at least two lanes, the reverse battery protection switch of each lane being located in the electrical circuit such that when it is open it does not isolate the filter capacitor from the drive circuit whilst isolating the battery.

11. An electrical circuit for driving at least one electric motor, the at least one electric motor having at least one set of phase windings, the circuit being arranged as at least one lane comprising a motor drive circuit that is operable in use to supply drive voltages to one of the at least one sets of phase windings of the at least one electric motor, the electrical circuit including for the at least one lane a respective reverse battery protection circuit located in either a feed to the motor drive circuit from a power supply or in a return path from the motor drive circuit to the power supply, the reverse battery protection circuit comprising a switch which is normally open when a battery of the power supply is disconnected and which remains open in the event that the battery is connected in error with a reverse polarity to the motor drive circuit, wherein the electrical circuit includes a control means which is arranged to control the switch of the reverse battery protection circuit so as to close the switch in the event that the control means determines that the battery is connected with a correct polarity, and further in that the control means is additionally arranged to open the switch during operation of the electric motor in the event that that one or more additional conditions are met, in which the one or more additional conditions include a back emf generated by the electric motor substantially reaching or exceeding an instantaneous battery supply voltage.

* * * * *